United States Patent
Shi et al.

(10) Patent No.: US 11,990,956 B2
(45) Date of Patent: May 21, 2024

(54) COMMUNICATION METHOD AND APPARATUS, TERMINAL, AND STORAGE MEDIUM

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Yun Fang, Dongguan (CN); Yingpei Huang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/861,335

(22) Filed: Jul. 11, 2022

(65) Prior Publication Data
US 2022/0352934 A1    Nov. 3, 2022

Related U.S. Application Data

(63) Continuation of application No. PCT/CN2020/083925, filed on Apr. 9, 2020.

(30) Foreign Application Priority Data

Jan. 17, 2020 (WO) .............. PCT/CN2020/072756

(51) Int. Cl.
H04B 7/0456    (2017.01)
(52) U.S. Cl.
CPC ................. H04B 7/0456 (2013.01)

(58) Field of Classification Search
CPC .......... H04B 7/04; H04B 7/06; H04B 7/0413; H04B 7/0426; H04B 7/0456; H04L 5/00;
(Continued)

(56) References Cited

U.S. PATENT DOCUMENTS 9,287,948 B2    3/2016   Kim et al.
2018/0368083 A1  12/2018  Yang et al.
(Continued)

FOREIGN PATENT DOCUMENTS

CN    102083223 A    6/2011
CN    102835054 A    12/2012
(Continued)

OTHER PUBLICATIONS

"Details on Full Power Uplink Transmission", R1-1910415, Source: InterDigital Inc., 3GPP TSG RAN WG1 #98bis, Chongqing, China, Oct. 14-20, 2019, 8 pages.
(Continued)

*Primary Examiner* — Shawkat M Ali
(74) *Attorney, Agent, or Firm* — BAYES PLLC

(57) ABSTRACT

The present disclosure relates to a communication method and apparatus, a terminal, and a storage medium. A terminal device sends first indication information to a network device, the first indication information being used to indicate a first transmitted precoding matrix indicator (TPMI) group, and the first TPMI group being a TPMI group in a TPMI group set; and then, receives a first TPMI indicated by the network device. By using the described method, the uplink coverage capabilities of a terminal device and the uplink transmission performance of a terminal device can be increased.

20 Claims, 3 Drawing Sheets

(58) Field of Classification Search
CPC ..... H04L 5/0048; H04L 5/0053; H04L 25/02; H04W 8/22; H04W 52/14; H04W 52/18; H04W 52/36; H04W 72/04; H04W 72/12; H04W 72/14; H04W 88/06
USPC ................ 375/219, 260, 262, 267, 295, 316
See application file for complete search history.

(56) References Cited

U.S. PATENT DOCUMENTS

| | | | |
|---|---|---|---|
| 2019/0081678 A1 | 3/2019 | Park et al. | |
| 2019/0097710 A1 | 3/2019 | Park et al. | |
| 2019/0327693 A1 | 10/2019 | Rahman et al. | |
| 2022/0408368 A1* | 12/2022 | Rupasinghe | H04B 7/0456 |
| 2023/0008524 A1* | 1/2023 | Okamura | H04L 5/0048 |
| 2023/0155763 A1* | 5/2023 | Hao | H04B 7/048 370/329 |

FOREIGN PATENT DOCUMENTS

| | | |
|---|---|---|
| CN | 106936484 A | 7/2017 |
| CN | 109690962 A | 4/2019 |
| CN | 110535499 A | 12/2019 |
| CN | 110535508 A | 12/2019 |
| WO | 2019214648 A1 | 11/2019 |

OTHER PUBLICATIONS

"Discussions on full Tx power uplink transmission", R1-1912271, Source: LG Electronics, 3GPP TSG RAN WG1 #99, Reno, USA, Nov. 18-22, 2019, 9 pages.
International Search Report from the International Searching Authority Re. Application No. PCT/CN2020/072756, mailed Oct. 13, 2020, 4 pages.
Written Opinion from the International Searching Authority Re. Application No. PCT/CN2020/072756, mailed Oct. 13, 2020, 8 pages.
"Codebook-based UL transmission", R1-1721399, Source: Samsung, 3GPP TSG RAN WG1 Meeting #91, Reno, USA, Nov. 27-Dec. 1, 2017, 17 pages.
"Remaining issues on uplink non-codebook transmission", R1-179965, Source: OPPO, 3GPP TSG RAN WG1 Meeting#91, Reno, USA, Nov. 27-Dec. 1, 2017, 4 pages.
International Search Report from the International Searching Authority Re. Application No. PCT/CN2020/083925, mailed Aug. 3, 2020, 4 pages.
Written Opinion from the International Searching Authority Re. Application No. PCT/CN2020/083925, mailed Aug. 3, 2020, 8 pages.
First Office Action issued in corresponding Chinese application No. 202210893598.6, mailed Apr. 26, 2023.
Extended European Search Report issued in corresponding European application No. 20913494.9, mailed Dec. 5, 2022.
Vivo, "Feature lead summary on Full TX Power UL transmission", R1-1910561, 3GPP TSG RAN WG1#98bis Chongqing, China, Oct. 14-20, 2019.
Samsung, "RAN1 agreements for NR_eMIMO", R1-1913604, 3GPP TSG RAN WG1 99 Reno, USA Nov. 18-22, 2019.
Vivo, "Summary#2 of offline discussion on ULFPTx", R1-1913459, 3GPP TSG RAN WG1#99 Reno, USA, Nov. 18-22, 2019.
First Office Action issued in corresponding European application No. 20913494.9, mailed Aug. 10, 2023.
Notice of Allowance issued in corresponding Chinese application No. 202210893598.6, mailed Sep. 27, 2023.
Second Office Action issued in corresponding European application No. 20913494.9, mailed Jan. 24, 2024.

* cited by examiner

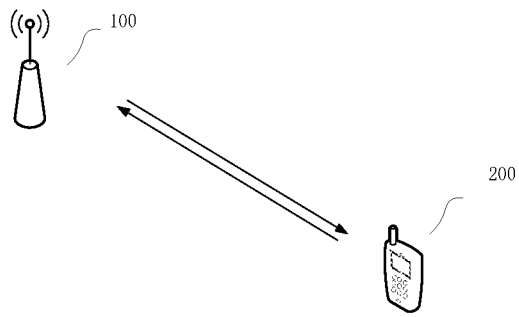

FIG. 1

```
sending first indication information to a network device, wherein the first     S101
  indication information indicates a first transmitted precoding matrix
  indicator (TPMI) group, and the first TPMI group is a TPMI group in a
                            TPMI group set receiving a first TPMI indicated by the network device                 S102
```

FIG. 2

```
receiving first indication information sent by a terminal device, wherein      S201
   the first indication information indicates a first transmitted precoding
matrix indicator (TPMI) group, and the first TPMI group is a TPMI group
                          in a TPMI group set sending a first TPMI to the terminal device                     S202
```

FIG. 3

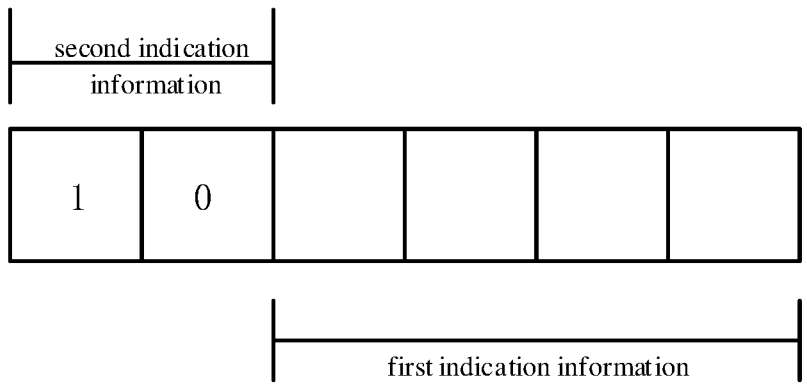

FIG. 4

COMMUNICATION METHOD AND APPARATUS, TERMINAL, AND STORAGE MEDIUM

CROSS REFERENCE TO RELATED APPLICATION

The present application is a continuation of International Application No. PCT/CN2020/083925, filed on Apr. 9, 2020, which claims the benefit of priority of International Application No. PCT/CN2020/072756, filed on Jan. 17, 2020, the contents of which are incorporated herein by reference in their entireties.

TECHNICAL FIELD

The present disclosure relates to the field of communication technologies, and in particular, to a communication method and apparatus, a terminal and a storage medium.

BACKGROUND

In New Radio (NR) systems, the coherent transmission capability of a terminal device is classified into fullCoherent, partialCoherent and nonCoherent according to coherent characteristics between respective antenna ports in the terminal device. A terminal device reports its own coherent transmission capability to a network. For a codebook based uplink transmission, the network selects an appropriate precoding matrix in a codebook subset corresponding to the coherent transmission capability according to the coherent transmission capability of the terminal device, and sends a Transmitted Precoding Matrix Indicator (TPMI) corresponding to the precoding matrix to the terminal device through Downlink Control Information (DCI). Thus, the terminal device may perform precoding processing on uplink data through the corresponding precoding matrix. Terminal devices with different coherent transmission capabilities correspond to different codebook subsets. A codebook subset corresponding to a nonCoherent type of terminal device is nonCoherent, a codebook subset corresponding to a fullCoherent type of terminal device may be fullyAndPartialAndNonCoherent, nonCoherent, or partialAndNonCoherent, and a codebook subset corresponding to a partialCoherent type of terminal device may be nonCoherent or partialAndNonCoherent, where nonCoherent indicates a subset of fullyAndPartialAndNonCoherent.

In the uplink transmission, in order to ensure transmission quality and reduce uplink interference, it is necessary to control a transmit power of the terminal device. During power control, the terminal device first calculates a transmit power according to network configuration information, etc. Then, after it is determined to scale the calculated transmit power, the terminal device calculates a power scaling factor for an actual transmission. After scaling the transmit power by the power scaling factor, the terminal device assigns the scaled transmit power to a non-zero transmission port of PUSCH for transmission.

However, for a terminal device whose coherent transmission capability is partialCoherent and nonCoherent, when the power control is performed according to the above method, there may be a situation where the terminal device cannot reach the maximum transmit power.

SUMMARY

Embodiments of the present disclosure provide a communication method and apparatus, a network device, a terminal, and a storage medium.

In a first aspect, a communication method includes: sending first indication information to a network device, wherein the first indication information indicates a first transmitted precoding matrix indicator (TPMI) group, and the first TPMI group is a TPMI group in a TPMI group set; and receiving a first TPMI indicated by the network device.

In a second aspect, a communication method includes: receiving first indication information sent by a terminal device, wherein the first indication information indicates a first transmitted precoding matrix indicator (TPMI) group, and the first TPMI group is a TPMI group in a preset TPMI group set; and sending a first TPMI to the terminal device.

In a third aspect, a communication apparatus includes a sending module and a receiving module.

The sending module is configured to send first indication information to a network device, wherein the first indication information indicates a first transmitted precoding matrix indicator (TPMI) group, and the first TPMI group is a TPMI group in a TPMI group set.

The receiving module is configured to receive a first TPMI indicated by the network device.

In a fourth aspect, a communication apparatus includes a receiving module and a sending module.

The receiving module is configured to receive first indication information sent by a terminal device, wherein the first indication information indicates a first transmitted precoding matrix indicator (TPMI) group, and the first TPMI group is a TPMI group in a TPMI group set.

The sending module is configured to send a first TPMI to the terminal device.

A fifth aspect, a terminal includes a transmitter and a receiver.

The transmitter is configured to send first indication information to a network device, wherein the first indication information indicates a first transmitted precoding matrix indicator (TPMI) group, and the first TPMI group is a TPMI group in a TPMI group set.

The receiver is configured to receive a first TPMI indicated by the network device.

In a sixth aspect, a network device includes a receiver and a transmitter.

The receiver is configured to receive first indication information sent by a terminal device, wherein the first indication information indicates a first transmitted precoding matrix indicator (TPMI) group, and the first TPMI group is a TPMI group in a TPMI group set.

The transmitter is configured to send a first TPMI to the terminal device.

In a seventh aspect, a computer-readable storage medium stores a computer program thereon. The computer program, when executed by a processor, implements steps of the communication method described above.

In the above communication method and apparatus, the terminal and the storage medium, the terminal device sends the first indication information to the network device, the first indication information indicates the first TPMI group, and the first TPMI group is a TPMI group in the TPMI group set. Then, the terminal device receives the first TPMI indicated by the network device. When the network device selects the first TPMI based on the first TPMI group to indicate it to the terminal device, the terminal device may perform full power transmission based on a target precoding matrix corresponding to the first TPMI. This improves an uplink coverage capability of the terminal device and an uplink transmission performance of the terminal device.

BRIEF DESCRIPTION OF THE DRAWINGS

In order to explain embodiments of the present disclosure or a technical solution in the prior art more clearly, drawings required in embodiments or descriptions of the prior art will be briefly introduced below. Obviously, drawings in the following description are some embodiments of the present disclosure, and other embodiments may be obtained by persons of ordinary skills in the art according to these drawings without paying creative labor.

FIG. 1 is a diagram of an application environment of a communication method provided by an embodiment of the present disclosure;

FIG. 2 is a flowchart of a communication method provided by an embodiment of the present disclosure;

FIG. 3 is a flowchart of a communication method provided by an embodiment of the present disclosure;

FIG. 4 is a schematic diagram of reporting in an embodiment of the present disclosure;

DETAILED DESCRIPTION

Figure 5:
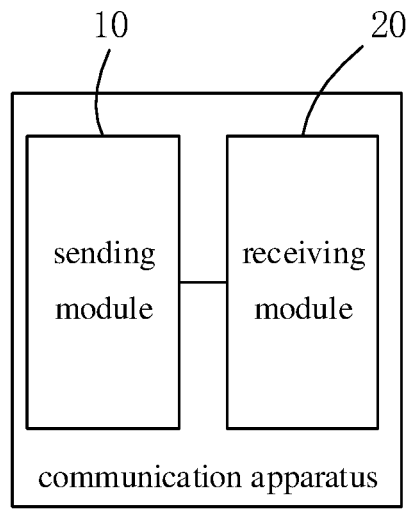
FIG. 5 is a block diagram of a communication apparatus provided by an embodiment of the present disclosure.

In order to make objectives, technical solutions, and advantages of embodiments of the present disclosure clearer, the present disclosure will be described in further detail in conjunction with drawings and embodiments. It should be understood that specific embodiments described herein are only used to explain the present disclosure, but not to limit the present disclosure.

In New Radio (NR) systems, the coherent transmission capability of a terminal device may be classified into full-Coherent, partialCoherent and nonCoherent according to coherent characteristics between respective antenna ports in the terminal device.

NonCoherent means that a phase difference between any two antenna ports in the terminal device cannot maintain a constant relationship. For example, the phase difference between two antenna ports may vary. It is difficult to remain the same for a certain period of time. Alternatively, a variation range of the phase difference between two antenna ports in a certain period of time is beyond a certain range.

PartialCoherent means that antenna ports of the terminal device are grouped into a plurality of groups. A phase difference between antenna ports in each group may maintain a constant relationship, but a phase difference between antenna ports in different groups cannot maintain a constant relationship.

FullCoherent means that a phase difference between all antenna ports of the terminal device may maintain a constant relationship. The above-mentioned antenna port is an abstract representation of a physical antenna port. The antenna ports are in a one-to-one or one-to-many correspondence with the physical antenna ports.

The terminal device reports its own coherent transmission capability to the network. A terminal device with two ports may have two types of nonCoherent and fullCoherent. A terminal device with four ports may have three types of nonCoherent, partialCoherent and fullCoherent. After receiving the coherent transmission capability uploaded by the terminal device, for a codebook based uplink transmission, the network device may select an appropriate precoding matrix in a codebook subset corresponding to the coherent transmission capability according to the coherent transmission capability of the terminal device, and further send a TPMI corresponding to the precoding matrix to the terminal device through DCI. Thus, the terminal device may perform precoding processing on uplink data through the precoding matrix corresponding to the TPMI.

At present, the protocol specifies three different codebook subsets, including: fullyAndPartialAndNonCoherent, partialAndNonCoherent, and nonCoherent, where fullyAndPartialAndNonCoherent may be applied to a terminal whose coherent transmission capability is fullCoherent; partialAndNonCoherent may be applied to a terminal whose coherent transmission capability is partialCoherent and fullCoherent; and nonCoherent may be applied to a terminal whose coherent transmission capability is nonCoherent, partialCoherent, and fullCoherent. For a terminal device supporting four antenna ports, the codebook subset nonCoherent is a subset of partialAndNonCoherent, and partialAndNonCoherent is a subset of fullyAndPartialAndNonCoherent.

In the uplink transmission, in order to ensure transmission quality and reduce uplink interference, it is necessary to control a transmit power of the terminal device. During the uplink power control, the terminal device may calculate a transmit power according to network configuration information and/or scheduling information corresponding to the uplink transmission, such as frequency domain resource allocation information, transmit power control (TPC) commands, etc. Then, the terminal device determines whether to scale the calculated transmit power according to the current transmission situation. Finally, when it is determined that the calculated transmit power needs to be scaled, the terminal device calculates a power scaling factor based on Physical Uplink Shared Channel (PUSCH) port information. After scaling the calculated transmit power by the power scaling factor, the terminal device assigns the scaled transmit power to a PUSCH non-zero transmission port for transmission. The PUSCH non-zero transmission port may correspond to a non-zero transmission port of a precoding matrix used by PUSCH.

A method for calculating a scaling factor comprises dividing the number of PUSCH non-zero transmission ports by the maximum number of ports of a Sounding Reference Signal (SRS) that the terminal device supports. For example, for a terminal device with two antenna ports and having coherent transmission capability of nonCoherent, a precoding matrix corresponding to a TPMI sent by the network device is $1/\sqrt{2}[1\ 0]^T$. As can be seen from the precoding matrix, the number of corresponding PUSCH non-zero transmission ports is 1, and the maximum number of ports that the terminal device supports is 2. Accordingly, the calculated scaling factor is 0.5. That is, when the transmit power calculated by the terminal device is 20 dBm, the actual transmit power can only be 17 dBm. As a result, when the maximum transmit power of the terminal device is 23 dBm, the actual maximum transmit power of the terminal device is 20 dBm. Therefore, for a terminal device whose coherent transmission capability is partialCoherent and non-Coherent, when the power control is performed according to the above method, an uplink signal cannot be sent with the maximum power. This is a situation referred to as inability to perform full power transmission.

Based on the above situation, embodiments of the present disclosure provide a communication method. The method may be applied to smart services based on 5G communication technologies and IoT-related technologies, such as smart homes, smart buildings, smart cities, smart cars, networked cars, healthcare, digital education, smart retail, safety and security services. FIG. 1 is a schematic diagram of an application scenario of a communication method provided by an embodiment of the present disclosure. As shown in FIG. 1, the scenario includes a network device 100 and a terminal device 200. The network device 100 and the terminal device 200 communicate through a network. The network device 100 may be a Base Transceiver Station (BTS) in a Global System of Mobile communication (GSM) or a Code Division Multiple Access (CDMA), or a NodeB (NB) in a Wideband Code Division Multiple Access (WCDMA), or an evolved NodeB (eNB or eNodeB) in LTE, or a relay station or an access point, or a base station in a 5G network, etc., which are not limited here.

The terminal device 200 may be a wireless terminal, which may be a device that provides voice and/or other service data connectivity to a user, a handheld device with a wireless connectivity function, or another processing device connected to a wireless modem. The wireless terminal may communicate with one or more core networks via a Radio Access Network (RAN). The wireless terminal may be a mobile terminal, such as a mobile phone (or referred to as a "cellular" phone), a computer with a mobile terminal. For example, the wireless terminal may also be a portable, pocket, handheld, computer built-in or in-vehicle mobile device exchanging voice and/or data with the wireless access network, such as a Personal Communication Service (PCS) phone, a cordless phone, a Session Initiation Protocol (SIP) phone, a Wireless Local Loop (WLL) station, a Personal Digital Assistant (PDA) and the like.

Technical solutions of the present disclosure are described below with specific embodiments. The following specific embodiments may be combined with each other, and the same or similar concepts or processes may not be repeated in some embodiments. Embodiments of the present disclosure will be described below with reference to the accompanying drawings.

FIG. 2 is a flowchart of a communication method in an embodiment of the present disclosure. The communication method in an embodiment is described by taking the method to be run in the terminal device shown in FIG. 1 as an example. As shown in FIG. 2, the above communication method includes the following steps S101 and S102.

In the step S101, first indication information is sent to a network device. The first indication information indicates a first transmitted precoding matrix indicator (TPMI) group, and the first TPMI group is a TPMI group in a TPMI group set.

Optionally, a precoding matrix corresponding to a TPMI in the first TPMI group is a precoding matrix that supports the terminal device to perform PUSCH full power transmission.

The first TPMI group is a TPMI group in a preset TPMI group set. A precoding matrix set corresponding to each TPMI group may include at least one precoding matrix.

In a MIMO system, the terminal device and the network device may realize parallel transmission of a plurality of signal streams in the air through a plurality of antennas. For example, in the uplink transmission, the terminal device transmits several parallel data streams through a plurality of antenna ports. Then, the network device receives the parallel data streams at a receiving end through a plurality of receiving antennas, and detects a signal sent by the terminal device.

In order to improve transmission efficiency of the data stream, the MIMO system may use a space division multiplexing mode. For example, one high-speed data stream is divided into several lower-rate data streams, which are processed by precoding and then sent from different antenna ports. The precoding matrix may be stored in a codebook in the device. The codebook includes multiple codewords, and each codeword is a precoding matrix. For the uplink transmission, the corresponding precoding matrix as mentioned above may be identified by TPMI.

In addition to a specific coefficient given in some embodiments, the coefficient of the precoding matrix involved in some embodiments of the present disclosure may also be 1 or another value.

The precoding matrix set corresponding to the first TPMI group may include one precoding matrix, or may include multiple precoding matrices, which is not limited herein. The number of TPMI groups included in the TPMI group set is not limited here. There may be six TPMI groups or ten TPMI groups. Optionally, the TPMI group set may include at least eight TPMI groups. For example, when the terminal device uses four bits to report the first TPMI group (for a case where the terminal device supports four antenna ports), the TPMI group set may include sixteen TPMI groups, or may include fifteen TPMI groups. Alternatively, there may be other numbers of TPMI groups. The TPMI group set includes at least eight TPMI groups. This helps to greatly improve a selectable range of the terminal device when selecting the first TPMI group in the TPMI group set, so that the terminal device may select a more matching first TPMI group for reporting.

In each TPMI group of the TPMI group set, two different TPMI groups may contain partially identical precoding matrices.

The TPMI group may be applicable to terminal devices of different implementation types, and the implementation types may be terminal devices that support different power architectures. For example, when the terminal device has full power transmission capability, it may report the first indication information to the network device, and the first indication information indicates a respective TPMI group in the TPMI group set. Optionally, the first indication information also indicates that the terminal device may achieve full power transmission by using the precoding matrix included in the above TPMI group.

Optionally, when sending the first indication information indicative of the first TPMI group to the network device, the terminal device may determine the first TPMI group indicated by the first indication information based on the number of antenna ports of the terminal device and the TPMI group set. For example, when the number of antenna ports supported by the terminal device is four, according to the power capability corresponding to each antenna port, the first TPMI group may be selected from the TPMI group set corresponding to the terminal device supporting four antenna ports, and further reported to the network device through the first indication information.

Specifically, the terminal device may send the first indication information to the network device through higher layer signaling. Optionally, the terminal device may send the first indication information to the network device through Radio Resource Control (RRC) signaling. Optionally, the terminal device may send the first indication information to the network device through terminal capability reporting signaling.

The terminal device may be a terminal device supporting transmission with two antenna ports, a terminal device supporting transmission with four antenna ports, or a terminal device supporting transmission with other multiple antenna ports, which is not limited herein. The number of antenna ports refers to the number of logical ports, which may be equal to the number of physical antenna ports (or physical antennas), or may be smaller than the number of physical antenna ports. For example, a terminal device with four physical antenna ports may support transmission with four antenna ports, or two of the physical antenna ports may be virtualized to form two antenna ports for supporting transmission with two antenna ports. In the following description, the antenna port is sometimes simply referred to as port, e.g., 2-port transmission, 4-port terminal device.

The terminal device may report the TPMI group according to the number of antenna ports and the coherent transmission capability of the terminal device. For example, for a terminal device supporting four antenna ports, on the basis of reporting the first TPMI group through the first indication information, a 2-bit bitmap may also be used to report second indication information. In this case, each bit corresponds to one precoding matrix, and is used to indicate whether the corresponding precoding matrix may support full power transmission. Reporting is not limited here.

In addition, when the terminal device sends the first indication information indicative of the first TPMI group to the network device, it may also report to the network device that the terminal device supports a first full power transmission mode. The first full power transmission mode is used to characterize that the terminal device has full power transmission capability.

Optionally, the first full power transmission mode may be reported through the RRC signaling, or may be reported through the terminal capability signaling.

Optionally, when the terminal device reports the first full power transmission mode to the network device, reporting of the first indication information may be optional reporting. That is, when the terminal device reports the first full power transmission mode to the network device, the first indication information is optionally sent.

Optionally, when the terminal device reports the first full power transmission mode to the network device, reporting of the first indication information may be mandatory reporting. That is, when the terminal device reports the first full power transmission mode to the network device, it must simultaneously send the first indication information to the network device.

Further, the network device may select one TPMI from the first TPMI group sent by the terminal device for sending to the terminal device according to the received first full power transmission mode. Alternatively, the network device may select another TPMI from a codeword subset corresponding to the terminal device for sending to the terminal device for PUSCH transmission, which is not limited here.

If the network device configures the terminal device to operate in the first full power transmission mode, it may also send a sounding reference signal (SRS) resource set to the terminal device. The SRS resource set may be configured with at least one SRS resource, and carries the number of ports corresponding to each SRS resource. The number of ports corresponding to each SRS resource may be the same. Optionally, the number of ports corresponding to part or all of the SRS resources may be different. The SRS resource may correspond to one port, or may correspond to two ports. Optionally, the number of ports corresponding to the SRS resource is less than or equal to four. For example, if the SRS resource set carries two SRS resources, the number of ports corresponding to one SRS resource may be two, and the number of ports corresponding to the other SRS resource may be four. If the SRS resource set carries four SRS resources, the number of ports corresponding to two SRS resources may be one, and the number of ports corresponding to the other two SRS resource may be two.

Each SRS resource as mentioned above may correspond to the same spatial relation information, or may correspond to different spatial relations. Optionally, the number of spatial relations corresponding to all SRS resources is less than or equal to two. Optionally, the SRS resource set is used to support codebook based PUSCH transmission. The usage configuration corresponding to the SRS resource set may be "codebook".

In the step S102, a first TPMI indicated by the network device is received.

If the first TPMI corresponds to one of precoding matrices in the first TPMI group, the terminal device may use a target precoding matrix corresponding to the first TPMI for full power transmission. If the first TPMI does not belong to the first TPMI group, the terminal device uses the target precoding matrix corresponding to the first TPMI, and performs corresponding power control according to a prescribed power scaling method.

Optionally, if the precoding matrix corresponding to the first TPMI has full power transmission capability, the terminal device may use the target precoding matrix corresponding to the first TPMI for full power transmission. If the first TPMI does not belong to the first TPMI group, the terminal device may perform corresponding power control according to a prescribed power scaling method. For example, the terminal device uses the first TPMI with full power transmission capability to obtain the scaling factor of 1, and then uses the scaling factor to perform full power transmission.

After the terminal device sends the first TPMI group to the network, the network device may select one precoding matrix, and then send it to the terminal device through DCI. In this way, the terminal device obtains the target precoding matrix indicated by the DCI based on a predetermined format of the DCI.

If the target precoding matrix obtained by the terminal device is included in a precoding matrix set corresponding to the first TPMI group as reported, the terminal device uses the target precoding matrix to perform precoding processing on the uplink data, and then assigns the precoded uplink data to the PUSCH non-zero port, which in turn leading to full power transmission of the precoded uplink data.

It should be noted that when the terminal device performs full power transmission, the transmit power is obtained based on the network configuration information sent by the network device and/or scheduling information corresponding to the uplink transmission, such as frequency domain resource allocation information, TPC commands, etc.

Specifically, when the terminal device performs full power transmission, it may not perform scaling processing on the calculated transmit power during the uplink power control process, but may allocate the calculated transmit power to the port corresponding to PUSCH. Alternatively, the terminal device scales the calculated transmit power by using the scaling factor of 1, and allocates the scaled transmit power to the port corresponding to PUSCH. An implementation of full power transmission is not limited herein.

In the above communication method, the terminal device sends the first indication information to the network device, and the first indication information indicates the first TPMI group. The first TPMI group is a TPMI group in the TPMI group set. Then, the terminal device receives the first TPMI indicated by the network device. When the network device selects the first TPMI based on the first TPMI group to indicate it to the terminal device, the terminal device may perform full power transmission based on a target precoding matrix corresponding to the first TPMI. This improves an uplink coverage capability of the terminal device and an uplink transmission performance of the terminal device FIG. 3 is a flowchart of a communication method in an embodiment of the present disclosure. The communication method in an embodiment is described by taking the method to be run in the network device shown in FIG. 1 as an example. As shown in FIG. 3, the communication method includes the following steps S201 and S202.

In the step S201, first indication information sent by a terminal device is received, where the first indication information indicates a first transmitted precoding matrix indicator (TPMI) group, and the first TPMI group is a TPMI group in a TPMI group set.

In the step S202, a first TPMI is send to the terminal device.

The implementation principle and technical effects in the foregoing embodiment are similar to those in the embodiment corresponding to FIG. 2, and are thus not repeated here.

In an embodiment, the TPMI group set may include a basic TPMI group and/or a newly added TPMI group. The newly added TPMI group is obtained based on part or all elements in the basic TPMI group. The number of basic TPMI groups and the number of newly added TPMI groups included in the TPMI group set are not limited.

For example, the TPMI group set may include six TPMI groups, and the six TPMI groups may include four basic TPMI groups and two newly added TPMI groups. For another example, the TPMI group set may also include ten TPMI groups, and the ten TPMI groups may include six basic TPMI combinations and four newly added TPMI groups.

Optionally, the basic TPMI group may correspond to the number of first target ports of the terminal device and/or the number of second target ports of the terminal device. The first target port is a port with full power transmission capability in the terminal device. The second target port is a port with half power transmission capability in the terminal device.

Optionally, the basic TPMI group may be at least one of TPMI group G0, TPMI group G1, TPMI group G2, TPMI group G3, TPMI group G4, TPMI group G5, and TPMI group G6.

Optionally, the basic TPMI group may include at least one of the TPMI groups as follows.

The precoding matrix in TPMI group G0 is used to indicate that one first target port with full power transmission capability is included in the terminal device. The precoding matrix in TPMI group G1 is used to indicate that two first target ports with full power transmission capability are included in the terminal device. The precoding matrix in TPMI group G2 is used to indicate that three first target ports with full power transmission capability are included in the terminal device. The precoding matrix in TPMI group G3 is used to indicate that three second target ports with half power transmission capability are included in the terminal device. The precoding matrix in TPMI group G4 is used to indicate that two coherent second target ports with half power transmission capability are included in the terminal device. The precoding matrix in TPMI group G5 is used to indicate that three second target ports with half power transmission capability are included in the terminal device, where the three second target ports include a coherent port group. The precoding matrix in TPMI group G6 is used to indicate that four second target ports with half power transmission capability are included in the terminal device, where the four second target ports include two coherent port groups.

Optionally, the terminal device may be a device with four antenna ports. The basic TPMI group may be as shown in the following table:

| TPMI group | Precoding matrix included in the TPMI group |
|---|---|
| G0 | $\frac{1}{2}\begin{bmatrix}1\\0\\0\\0\end{bmatrix}$ |
| G1 | $\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}$ |
| G2 | $\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |

-continued

| TPMI group | Precoding matrix included in the TPMI group |
|---|---|
| G4 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}$ |
| G5 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}$ |
| G6 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$ $\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}$ |

For the terminal device with four antenna ports, the precoding matrix corresponding to TPMI group G0 may include the precoding matrix shown in the second row of the above table. For example, when one of power amplifiers in the terminal device supports full power transmission, G0 may be reported to the network device. For example, the maximum transmit power corresponding to the terminal device is 23 dBm. When a transmit power of one of the power amplifiers in the terminal device may reach 23 dBm, the terminal device may use the precoding matrix to achieve full power transmission.

The precoding matrix corresponding to TPMI group G1 may include the precoding matrix shown in the third row of the above table. For example, when two power amplifiers in the terminal device support full power transmission, G1 may be reported to the network device. For example, the maximum transmit power corresponding to the terminal device is 23 dBm. When the transmit power of two power amplifiers in the terminal device may reach 23 dBm, the terminal device may use a precoding matrix with a layer number of 1 in G1 to achieve full power transmission. When the number of layers in the data stream is 2, the precoding matrix with the layer number of 2 in G1 is used to realize full power transmission.

The precoding matrix corresponding to TPMI group G2 may include the precoding matrix shown in the fourth row of the above table. For example, when three power amplifiers in the terminal device support full power transmission, G2 may be reported to the network device. For example, the maximum transmit power corresponding to the terminal device is 23 dBm. When the transmit power of three power amplifiers in the terminal device may reach 23 dBm, the terminal device may use a precoding matrix with a layer number of 1 in G2 to achieve full power transmission. When the number of layers in the data stream is 2, the precoding matrix with the layer number of 2 in G2 is used to realize full power transmission. In addition, when the number of layers in the data stream is 3, the precoding matrix with the layer number of 3 in G2 is used to realize full power transmission.

The precoding matrix corresponding to TPMI group G3 may include the precoding matrix shown in the fifth row of the above table. For example, when three power amplifiers in the terminal device support half power transmission, G3 may be reported to the network device. For example, the maximum transmit power corresponding to the terminal device is 23 dBm. When the transmit power of three power amplifiers in the terminal device may reach 20 dBm, the terminal device may use a precoding matrix with a layer number of 2 in G3 to achieve full power transmission. When the number of layers in the data stream is 3, the precoding matrix with the layer number of 3 in G3 is used to realize full power transmission.

It should be noted that, the above-mentioned TPMI group G0 to TPMI group G3 may be applicable to both the terminal device with nonCoherent transmission capability and the terminal device with partialCoherent transmission capability.

The precoding matrix corresponding to TPMI group G4 may include the precoding matrix shown in the sixth row of the above table. For example, when two power amplifiers in the terminal device support half power transmission, and the antenna ports corresponding to the two power amplifiers are coherent, G4 may be reported to the network device. For example, the maximum transmit power corresponding to the terminal device is 23 dBm. When the transmit power of two power amplifiers in the terminal device may reach 20 dBm, the terminal device may use a precoding matrix with a layer number of 1 in G4 to achieve full power transmission. When the number of layers in the data stream is 2, the precoding matrix with the layer number of 2 in G4 is used to realize full power transmission.

The precoding matrix corresponding to TPMI group G5 may include the precoding matrix shown in the seventh row of the above table. For example, when three power amplifiers in the terminal device support half power transmission, and the antenna ports corresponding to two of the three power amplifiers are coherent, G5 may be reported to the network device. For example, the maximum transmit power corresponding to the terminal device is 23 dBm. When the transmit power of three power amplifiers in the terminal device may reach 20 dBm, the terminal device may use a precoding matrix with a layer number of 1 in G5 to assign the uplink data to two coherent second target ports for achieving full power transmission. When the number of layers in the data stream is 2, the precoding matrix with the layer number of 2 in G5 is used to realize full power transmission. In addition, when the number of layers in the data stream is 3, the precoding matrix with the layer number of 3 in G5 is used to realize full power transmission.

The precoding matrix corresponding to TPMI group G6 may include the precoding matrix shown in the eighth row of the above table. For example, when four power amplifiers in the terminal device support half power transmission, and the four power amplifiers correspond to two coherent antenna port groups, G6 may be reported to the network device. For example, the maximum transmit power corresponding to the terminal device is 23 dBm. When the transmit power of four power amplifiers in the terminal device may reach 20 dBm, the terminal device may use a precoding matrix with a layer number of 1 in G6 to achieve full power transmission. When the number of layers in the data stream is 2, the precoding matrix with the layer number of 2 in G6 is used to realize full power transmission. In addition, when the number of layers in the data stream is 3, the precoding matrix with the layer number of 3 in G6 is used to realize full power transmission.

It should be noted that the above-mentioned TPMI group G4 to TPMI group G6 are applicable to the terminal device with partialCoherent transmission capability.

Optionally, the above group G0-G6 may also only include part of the precoding matrices in the respective rows of the above table.

Optionally, when the TPMI group set includes at least eight TPMI groups, the at least eight TPMI groups may include some basic TPMI groups in the seven basic TPMI groups as mentioned above, or may include all basic TPMI groups, which is not limited herein. For example, the at least eight TPMI groups may include six basic TPMI groups and at least two newly added TPMI groups.

Optionally, the number of TPMI groups in the TPMI group set may be greater than eight, or may be less than eight. The TPMI groups in the TPMI group set may include part or all of the seven basic TPMI groups as mentioned above, and at least one newly added TPMI group. The newly added TPMI group is obtained based on part or all of the elements in the seven basic TPMI groups. For example, the TPMI group in the TPMI group set includes at least TPMI group G0, TPMI group G4, TPMI group G5, TPMI group G6 and at least one newly added TMPI group. The newly added TPMI group may be obtained based on the basic TPMI groups in the reported TPMI group set, may also be obtained based on other basic TPMI groups, or may be obtained based on the basic TMPI groups and other TPMI groups in the reported TPMI group set, which is not limited here. In an implementation, the TPMI groups in the TPMI group set includes seven TPMI groups, which are respectively: TPMI group G0, TPMI group G4, TPMI group G5, TPMI group G6, a newly added TPMI group formed by combining TPMI group G1 and TPMI group G4, a newly added TPMI group formed by combining TPMI group G2 and TPMI group G4, and a newly added TPMI group formed by combining TPMI group G3 and TPMI group G4. In another implementation, the TPMI groups in the TPMI group set include at least eight TPMI groups, which are respectively: TPMI group G0, TPMI group G4, TPMI group G5, TPMI group G6, a newly added TPMI group formed by combining TPMI group G1 and TPMI group G4, a newly added TPMI group formed by combining TPMI group G2 and TPMI group G4, a newly added TPMI group formed by combining TPMI group G3 and TPMI group G4, and other newly added TPMI groups obtained based on seven basic TPMI groups.

The newly added TPMI group may be obtained based on part or all of the above-mentioned seven basic TPMI groups. Specifically, the newly added TPMI group may be obtained based on two basic TPMI groups, or may be obtained based on three TPMI groups, which is not limited herein. In addition, the newly added TPMI group may be directly formed by combining two basic TPMI groups, or obtained by adjusting a position of a non-zero port in the TPMI group. A method for obtaining the newly added TPMI group is not limited here.

In an implementation, a precoding matrix corresponding to the newly added TPMI group may include: a precoding matrix in TPMI group G0 and part or all of precoding matrices in a first set, where the first set is at least one of TPMI group G4, TPMI group G5, and TPMI group G6.

In another implementation, the precoding matrix corresponding to the newly added TPMI group includes: part or all of precoding matrices in TPMI group G1, and part or all of precoding matrices in a first set.

In another implementation, the precoding matrix corresponding to the newly added TPMI group includes: the precoding matrix in TPMI group G2, and part or all of precoding matrices in a second set, where the second set is at least one of TPMI group G5 and TPMI group G6.

In another implementation, the precoding matrix corresponding to the newly added TPMI group includes: the precoding matrix in TPMI group G0, and matrices obtained by non-zero port adjustment of part or all of precoding matrices in the first set.

For example, the newly added TPMI group may include one precoding matrix in TPMI group G1 and some of precoding matrices in TPMI group G4, and may also include one precoding matrix in TPMI group G1 and some of precoding matrices in TPMI group G4, which is not limited here.

In the above communication method, the TPMI group set includes the basic TPMI group and the newly added TPMI group, and the newly added TPMI group is obtained based on the basic TPMI group. Thus, a selectable range of the terminal device when selecting the first TPMI group in the TPMI group set is greatly improved, so that the terminal device can select a more matching first TPMI group for reporting. Further, when the network device selects a first TPMI based on the first TPMI group and sends it to the terminal device, the terminal device may perform full power transmission based on the target precoding matrix indicated by the TPMI. This improves the uplink coverage capability of the terminal device and the uplink transmission performance of the terminal device.

In the following several embodiments, newly added TPMI groups applicable to terminal devices of different implementation types are respectively introduced.

In an embodiment, the precoding matrix corresponding to the newly added TPMI group includes: the precoding matrix in TPMI group G0, and part or all of precoding matrices in TPMI group G4. Optionally, the precoding matrix corresponding to the newly added TPMI group includes: all precoding matrices in TPMI group G0, and all precoding matrices in TPMI group G4. The precoding matrix corresponding to the newly added TPMI group G01 may include:

$$\frac{1}{2}\begin{bmatrix}1\\0\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 17, 20, 17] dBm, respectively, if the first TPMI group is reported based on the basic TPMI group, only one of TPMI group G0 or TPMI group G4 may be selected. After the newly added TPMI group is added to the TPMI group set, the terminal device of this type may report the newly added TPMI group, so that more precoding matrices can support full power transmission. Therefore, the newly added TPMI group can better support the terminal device of this implementation type, and improve the uplink transmission capability of the terminal device.

In an embodiment, the precoding matrix corresponding to the newly added TPMI group includes: the precoding matrix in TPMI group G0, and part or all of precoding matrices in TPMI group G5.

Optionally, the precoding matrix corresponding to the newly added TPMI group includes: all precoding matrices in TPMI group G0, and all precoding matrices in TPMI group G5. The precoding matrix corresponding to the newly added TPMI group G02 may include:

$$\frac{1}{2}\begin{bmatrix}1\\0\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix},$$

$$\frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}0 & 0\\1 & 0\\0 & 1\\0 & 0\end{bmatrix}, \frac{1}{2}\begin{bmatrix}1 & 0\\0 & 1\\0 & 0\\0 & 0\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 20, 20, 17] dBm, respectively, if the first TPMI group is reported based on the basic TPMI group, only one of TPMI group G0 or TPMI group G5 may be selected. After the newly added TPMI group is added to the TPMI group set, the terminal device of this type may report the newly added TPMI group, so that more precoding matrices may support full power transmission. Therefore, the newly added TPMI group may better support the terminal device of this implementation type, and improve the uplink transmission capability of the terminal device.

In an embodiment, the precoding matrix corresponding to the newly added TPMI group includes: the precoding matrix in TPMI group G0, and part or all of precoding matrices in TPMI group G6.

Optionally, the precoding matrix corresponding to the newly added TPMI group includes: all precoding matrices in TPMI group G0, and all precoding matrices in TPMI group G6. The precoding matrix corresponding to the newly added TPMI group G03 may include:

$$\frac{1}{2}\begin{bmatrix}1\\0\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\-1\end{bmatrix}, \frac{1}{2}\begin{bmatrix}0\\1\\0\\1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$$

$$\frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 0\\0 & 1\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix}, \frac{1}{2}\begin{bmatrix}0 & 0\\0 & 0\\1 & 0\\0 & 1\end{bmatrix}, \frac{1}{2}\begin{bmatrix}1 & 0\\0 & 1\\0 & 0\\0 & 0\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 20, 20, 20] dBm, respectively, if the first TPMI group is reported based on the basic TPMI group, only one of TPMI group G0 or TPMI group G6 may be selected. After the newly added TPMI group is added to the TPMI group set, the terminal device of this type may report the newly added TPMI group, so that more precoding matrices may support full power transmission. Therefore, the newly added TPMI group may better support the terminal device of this implementation type, and improve the uplink transmission capability of the terminal device.

In an embodiment, the precoding matrix corresponding to the newly added TPMI group includes: part or all of precoding matrices in TPMI group G1, and part or all of precoding matrices in TPMI group G4.

Optionally, the precoding matrix corresponding to the newly added TPMI group includes: all precoding matrices in TPMI group G1, and all precoding matrices in TPMI group G4. The precoding matrix corresponding to the newly added TPMI group G04 may include:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1 & 0\\0 & 0\\0 & 1\\0 & 0\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 17, 23, 17] dBm, respectively, if the first TPMI group is reported based on the basic TPMI group, only one of TPMI group G1 or TPMI group G4 may be selected. After the newly added TPMI group is added to the TPMI group set, the terminal device of this type may report the newly added TPMI group, so that more precoding matrices may support full power transmission. Therefore, the newly added TPMI group may better support the terminal device of this implementation type, and improve the uplink transmission capability of the terminal device.

In an embodiment, the precoding matrix corresponding to the newly added TPMI group includes: part or all of precoding matrices in TPMI group G1, and part or all of precoding matrices in TPMI group G5.

Optionally, the precoding matrix corresponding to the newly added TPMI group includes: all precoding matrices in TPMI group G1, and all precoding matrices in TPMI group G5. The precoding matrix corresponding to the newly added TPMI group G05 may include:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix},$$

-continued
$$\frac{1}{2}\begin{bmatrix}1\\0\\-j\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 20, 23, 17] dBm, respectively, if the first TPMI group is reported based on the basic TPMI group, only one of TPMI group G1 or TPMI group G5 may be selected. After the newly added TPMI group is added to the TPMI group set, the terminal device of this type may report the newly added TPMI group, so that more precoding matrices may support full power transmission. Therefore, the newly added TPMI group may better support the terminal device of this implementation type, and improve the uplink transmission capability of the terminal device.

In an embodiment, the precoding matrix corresponding to the newly added TPMI group includes: part or all of precoding matrices in TPMI group G1, and part or all of precoding matrices in TPMI group G6.

Optionally, the precoding matrix corresponding to the newly added TPMI group includes: all precoding matrices in TPMI group G1, and all precoding matrices in TPMI group G6. The precoding matrix corresponding to the newly added TPMI group G06 may include:

$$\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$$

$$\frac{1}{2}\begin{bmatrix}0\\1\\0\\-j\end{bmatrix}, \frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix},$$

$$\frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 20, 23, 20] dBm, respectively, if the first TPMI group is reported based on the basic TPMI group, only one of TPMI group G1 or TPMI group G6 may be selected. After the newly added TPMI group is added to the TPMI group set, the terminal device of this type may report the newly added TPMI group, so that more precoding matrices may support full power transmission. Therefore, the newly added TPMI group may better support the terminal device of this implementation type, and improve the uplink transmission capability of the terminal device.

In an embodiment, the precoding matrix corresponding to the newly added TPMI group includes: part or all of precoding matrices in TPMI group G2, and part or all of precoding matrices in TPMI group G5.

Optionally, the precoding matrix corresponding to the newly added TPMI group includes: all precoding matrices in TPMI group G2, and all precoding matrices in TPMI group G5. The precoding matrix corresponding to the newly added TPMI group G07 may include:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix},$$

$$\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 23, 23, 17] dBm, respectively, if the first TPMI group is reported based on the basic TPMI group, only one of TPMI group G2 or TPMI group G5 may be selected. After the newly added TPMI group is added to the TPMI group set, the terminal device of this type may report the newly added TPMI group, so that more precoding matrices may support full power transmission. Therefore, the newly added TPMI group may better support the terminal device of this implementation type, and improve the uplink transmission capability of the terminal device.

In an embodiment, the precoding matrix corresponding to the newly added TPMI group includes: part or all of precoding matrices in TPMI group G2, and part or all of precoding matrices in TPMI group G6.

Optionally, the precoding matrix corresponding to the newly added TPMI group includes: all precoding matrices in TPMI group G2, and all precoding matrices in TPMI group G6. The precoding matrix corresponding to the newly added TPMI group G08 may include:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix},$$

$$\frac{1}{2}\begin{bmatrix}0\\1\\0\\-j\end{bmatrix}, \frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix},$$

$$\frac{1}{2}\begin{bmatrix}1&0&0\\0&1&0\\0&0&1\\0&0&0\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 23, 23, 20] dBm, respectively, if the first TPMI group is reported based on the basic TPMI group, only one of TPMI group G2 or TPMI group G6 may be selected. After the newly added TPMI group is added to the TPMI group set, the terminal device of this type may report the newly added TPMI group, so that more precoding matrices may support full power transmission. Therefore, the newly added TPMI group may better support the terminal device of this implementation type, and improve the uplink transmission capability of the terminal device.

In an embodiment, the precoding matrix corresponding to the newly added TPMI group includes: the precoding matrix in TPMI group G0, and matrices obtained by non-zero port adjustment of part or all of precoding matrices in TPMI group G5.

Optionally, the precoding matrix corresponding to the newly added TPMI group includes: all precoding matrices in TPMI group G0, and matrices obtained by non-zero port adjustment of all precoding matrices in TPMI group G5. The precoding matrix corresponding to the newly added TPMI group G09 may include:

$$\frac{1}{2}\begin{bmatrix}1\\0\\0\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$$

$$\frac{1}{2}\begin{bmatrix}1&0\\0&0\\0&0\\0&1\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0&0\\0&1&0\\0&0&0\\0&0&1\end{bmatrix}.$$

In the above communication method, for a terminal device of one implementation type, for example, in a case where the corresponding level of maximum transmit power of the terminal device is 23 dBm, and powers of the power amplifiers corresponding to the four antenna ports are [23, 20, 17, 20] dBm, respectively, if the first TPMI group is reported based on the basic TPMI group, only TPMI group G0 may be selected. Accordingly, the network device can only select one precoding matrix from the precoding matrices in TPMI group G0 for sending. After the newly added TPMI group is added to the TPMI group set, the terminal device of this type may report the newly added TPMI group, so that more precoding matrices may support full power transmission. Therefore, the newly added TPMI group may better support the terminal device of this implementation type, and improve the uplink transmission capability of the terminal device.

It should be noted that when the TPMI group set includes one newly added TPMI group, the newly-added TPMI group may be any one of the newly-added TPMI groups G01-G09. When the TPMI group set includes two newly-added TPMI groups, the newly-added TPMI groups may include the newly-added TPMI group G01 and the newly-added TPMI group G02, may also include the newly-added TPMI group G01 and newly-added TPMI group G08, or may also be a combination of other newly-added TPMI groups. When the TPMI group set includes three newly added TPMI groups, the newly added TPMI groups may include the newly added TPMI group G01, the newly added TPMI group G02 and the newly added TPMI group G03, or may include the newly added TPMI group G01, the newly added TPMI group G02 and the newly-added TPMI group G08, or may also be a combination of other newly-added TPMI groups. Similarly, when the TPMI group set includes nine newly-added TPMI groups, the newly-added TPMI groups may include the newly-added TPMI group G01, the newly-added TPMI group G02, the newly-added TPMI group G03, the newly-added TPMI group G04, the newly-added TPMI group G05, the newly-added TPMI group G06, the newly-added TPMI group G07, the newly-added TPMI group G08, and the newly-added TPMI group G09. The combination of newly added TPMI groups is not limited herein.

In an embodiment, in a case where the terminal device has four antenna ports, it may be configured with two corresponding antenna ports for transmission. The terminal device may use a 2-bit bitmap to report second indication information, and the second indication information indicates whether the two corresponding precoding matrices support full power transmission by the terminal device upon 2-port transmission. Each bit corresponds to one precoding matrix, and the terminal device may use a precoding matrix indicated by the second indication information for full power transmission.

Optionally, a certain bit value of 1 in the bitmap is used to indicate that a precoding matrix corresponding to the bit supports full power transmission, and a certain bit value of 0 in the bitmap is used to indicate that a precoding matrix corresponding to the bit does not support full power transmission.

Optionally, the first indication information and the second indication information may be transmitted through the same signaling. For example, both are transmitted through the same RRC signaling. Optionally, the first indication information and the second indication information may also be transmitted through the same signaling as the first full power transmission mode.

Optionally, when the first indication information is sent to the network device, reporting of the second indication information may be optional reporting. That is, when the terminal device reports the first indication information to the network device, it may optionally report the second indication information corresponding to 2-port transmission.

Optionally, when the first indication information is sent to the network device, reporting of the second indication information may be mandatory reporting. That is, when the terminal device reports the first indication information to the network device, it must simultaneously report the second indication information corresponding to 2-port transmission.

As shown in FIG. 4, the first two bits in the figure are the second indication information; and the last four bits are used to report the first indication information indicating the first TPMI group. Optionally, the first indication information may be at the front, and the position of the second information may be at the back.

For example, when the 2-bit bitmap reported by the terminal device is 10, it indicates that the corresponding precoding matrix $1/\sqrt{2}[1\ 0]^T$ may perform full power transmission. When the bitmap reported by the terminal device is 01, it indicates that the corresponding precoding matrix $1/\sqrt{2}[1\ 0]^T$ may perform full power transmission.

In the above communication method, when reporting the first TPMI group to the network device, the terminal device also uses two bits to report the second indication information, and the second indication information indicates full power transmission capability of the terminal device in the case of 2 ports. Therefore, the network device may send the appropriate TPMI according to different transmission conditions of the terminal device. Thus, the terminal device may achieve full power transmission by receiving the specific TMPI indicated by the network device, regardless of whether the terminal device operates in the case of 4 ports or 2 ports, thereby improving the uplink transmission capability of the terminal device.

In addition, for the terminal device with nonCoherent transmission capability, when the terminal device reports one TPMI group in the TPMI group G0 to TPMI group G3 to the network device, the terminal device may also use the 2-bit bitmap to report the third indication information. The third indication information indicates whether the corresponding precoding matrix supports full power transmission by the nonCoherent terminal device upon 2-port transmission. Optionally, in the third indication information, a certain bit value of 1 in the bitmap is used to indicate that a precoding matrix corresponding to the bit supports full power transmission, and a certain bit value of 0 in the bitmap is used to indicate that a precoding matrix corresponding to the bit does not support full power transmission.

Optionally, the reporting of the third indication information may be optional reporting. That is, when the nonCoherent terminal device reports one TPMI group in the TPMI group G0 to TPMI group G3 to the network device, the terminal optionally reports the third indication information corresponding to the 2-port transmission of the terminal device.

Optionally, the reporting of the third indication information may be mandatory reporting. That is, when the nonCoherent terminal device reports one TPMI group in TPMI group G0 to TPMI group G3 to the network device, the terminal must reports the third indication information corresponding to the 2-port transmission of the terminal device.

In an embodiment, the network device may receive the first indication information reported by the terminal device through the radio resource control (RRC) signaling.

In an embodiment, the network device may receive the second indication information reported by the terminal device. The second indication information is used to indicate, through a bitmap, whether a corresponding precoding matrix supports full power transmission by the terminal device upon 2-port transmission.

In an embodiment, a bit value of 1 in the bitmap is used to indicate that a precoding matrix corresponding to the bit supports full power transmission, and a bit value of 0 in the bitmap is used to indicate that a precoding matrix corresponding to the bit does not support full power transmission.

In an embodiment, the first indication information and the second indication information received by the network device may be transmitted through the same signaling.

In an embodiment, the network device may receive the first full power transmission mode reported by the terminal device.

In an embodiment, the first full power transmission mode is reported through the RRC signaling.

In an embodiment, the network device may send a sounding reference signal (SRS) resource set to the terminal device, and at least one sounding reference signal (SRS) resource is carried in the SRS resource set.

In an embodiment, the number of ports corresponding to part or all of SRS resources is different.

In an embodiment, the number of ports corresponding to the SRS resources is less than or equal to four.

In an embodiment, the number of spatial relationships corresponding to all SRS resources is less than or equal to two.

In an embodiment, the SRS resource set is used for codebook based PUSCH transmission.

In the above communication method, while receiving the first TPMI group reported by the terminal device, the network device also receives the second indication information reported by the terminal device. The second indication information is used to indicate full power transmission capability of the terminal device in the case of 2 ports. Therefore, the network device may send the appropriate TPMI according to different transmission conditions of the terminal device. Thus, the terminal device may achieve full power transmission by receiving the specific TMPI indicated by the network device, regardless of whether the terminal device operates in the case of 4 ports or 2 ports, thereby improving the uplink transmission capability of the terminal device.

It is to be understood that although various operations in the flowchart in FIGS. 2 and 3 are shown in sequence according to indication by an arrow, these operations are not necessarily performed in the sequence indicated by the arrow. Unless expressly stated herein, there is no strict sequence limitation to these operations, which may be performed in other sequences. Moreover, at least some operations in FIGS. 2 and 3 may include multiple sub-operations or multiple stages, these sub-operations or stages are not necessarily completed at the same time moment but may be performed at different time moments, and these sub-operations or stages are not necessarily performed in a sequence but may be performed in turns or alternately with at least some of other operations or sub-operations or stages of the other operations.

In an embodiment, there is provided a communication apparatus. As shown in FIG. 5, the communication apparatus includes a sending module 10 and a receiving module 20.

The sending module 10 is configured to send first indication information to a network device, and the first indication information is used to indicate a first transmitted precoding matrix indicator (TPMI) group. The first TPMI group is a TPMI group in a TPMI group set.

The receiving module 20 is configured to receive a first TPMI indicated by the network device.

The implementation principle and technical effects of the communication apparatus provided by the foregoing embodiment are similar to those of the foregoing method embodiments, and details are not described herein again.

In an embodiment, a precoding matrix corresponding to a TPMI in the first TPMI group is a precoding matrix that supports the terminal device to perform PUSCH full power transmission.

Figure 6:
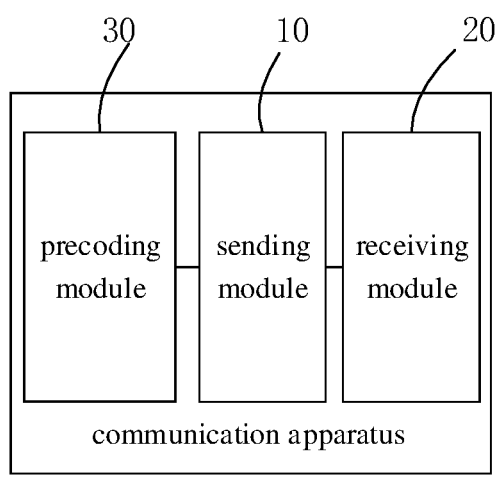
FIG. 6 is a block diagram of a communication apparatus provided by an embodiment of the present disclosure.

In an embodiment, as shown in FIG. 6, the apparatus further includes a precoding module 30, configured to perform full power transmission by using a target precoding matrix corresponding to the first TPMI. The target precoding matrix corresponding to the first TPMI is a precoding matrix that supports the terminal device to perform PUSCH full power transmission.

In an embodiment, the precoding module 30 is further configured to: when the first TPMI corresponds to a precoding matrix in the first TPMI group, perform full power transmission by using a target precoding matrix indicated by the first TPMI.

In an embodiment, on the basis of the foregoing embodiments, the first indication information is determined based on the number of antenna ports of a terminal device and the TPMI group set.

In an embodiment, the TPMI group set includes at least eight TPMI groups.

In an embodiment, the TPMI group set includes a basic TPMI group and/or a newly added TPMI group. The newly added TPMI group is obtained based on part or all of elements in the basic TPMI group.

In an embodiment, the at least eight TPMI groups include seven basic TPMI groups and at least one newly added TPMI group. The newly added TPMI group is obtained based on part or all of elements in the seven basic TPMI groups.

In an embodiment, the basic TPMI group corresponds to the number of first target ports of the terminal device and/or the number of second target ports of the terminal device. The first target port is a port with full power transmission capability in the terminal device. The second target port is a port with half power transmission capability in the terminal device.

In an embodiment, the basic TPMI group is at least one of TPMI group G0, TPMI group G1, TPMI group G2, TPMI group G3, TPMI group G4, TPMI group G5, and TPMI group G6.

In an embodiment, the basic TPMI group includes at least one of the following.

The precoding matrix in TPMI group G0 is used to indicate that one first target port is included in the terminal device.

The precoding matrix in TPMI group G1 is used to indicate that two first target ports are included in the terminal device.

The precoding matrix in TPMI group G2 is used to indicate that three first target ports are included in the terminal device.

The precoding matrix in TPMI group G3 is used to indicate that three second target ports are included in the terminal device.

The precoding matrix in TPMI group G4 is used to indicate that two coherent second target ports are included in the terminal device.

The precoding matrix in TPMI group G5 is used to indicate that three second target ports are included in the terminal device, where the three second target ports include a coherent port group.

The precoding matrix in TPMI group G6 is used to indicate that four second target ports are included in the terminal device, where the four second target ports include two coherent port groups.

In an embodiment, on the basis of the above-mentioned embodiments, the precoding matrix corresponding to the newly added TPMI group includes: a precoding matrix in TPMI group G0 and part or all of precoding matrices in a first set, where the first set is at least one of TPMI group G4, TPMI group G5, and TPMI group G6.

In an embodiment, on the basis of the foregoing embodiments, the precoding matrix corresponding to the newly added TPMI group includes: the precoding matrix in TPMI group G0, and part or all of precoding matrices in TPMI group G4.

In an embodiment, on the basis of the foregoing embodiments, the precoding matrix corresponding to the newly added TPMI group includes: the precoding matrix in TPMI group G0, and part or all of precoding matrices in TPMI group G5.

In an embodiment, on the basis of the foregoing embodiments, the precoding matrix corresponding to the newly added TPMI group includes: the precoding matrix in TPMI group G0, and part or all of precoding matrices in TPMI group G6.

In an embodiment, on the basis of the foregoing embodiments, the precoding matrix corresponding to the newly added TPMI group includes: part or all of precoding matrices in TPMI group G1, and part or all of precoding matrices in a first set, where the first set is at least one of TPMI group G4, TPMI group G5, and TPMI group G6.

In an embodiment, on the basis of the foregoing embodiments, the precoding matrix corresponding to the newly added TPMI group includes: part or all of precoding matrices in TPMI group G1, and part or all of precoding matrices in TPMI group G4.

In an embodiment, on the basis of the foregoing embodiments, the precoding matrix corresponding to the newly added TPMI group includes: part or all of precoding matrices in TPMI group G1, and part or all of precoding matrices in TPMI group G5.

In an embodiment, on the basis of the foregoing embodiments, the precoding matrix corresponding to the newly added TPMI group includes: part or all of precoding matrices in TPMI group G1, and part or all of precoding matrices in TPMI group G6.

In an embodiment, on the basis of the foregoing embodiments, the precoding matrix corresponding to the newly added TPMI group includes: part or all of precoding matrices in TPMI group G2, and part or all of precoding matrices in a second set, where the second set is at least one of TPMI group G5 and TPMI group G6.

In an embodiment, on the basis of the foregoing embodiments, the precoding matrix corresponding to the newly added TPMI group includes: part or all of precoding matrices in TPMI group G2, and part or all of precoding matrices in TPMI group G5.

In an embodiment, on the basis of the foregoing embodiments, the precoding matrix corresponding to the newly added TPMI group includes: part or all of precoding matrices in TPMI group G2, and part or all of precoding matrices in TPMI group G6.

In an embodiment, on the basis of the above-mentioned embodiment, the precoding matrix corresponding to the newly added TPMI group includes: part or all of precoding matrices in TPMI group G0, and matrices obtained by non-zero port adjustment of a precoding matrix in a first set, where the first set is at least one of TPMI group G4, TPMI group G5, and TPMI group G6.

In an embodiment, on the basis of the above-mentioned embodiment, the precoding matrix corresponding to the newly added TPMI group includes: the precoding matrix in TPMI group G0, and matrices obtained by non-zero port adjustment of part or all of precoding matrices in TPMI group G5.

In an embodiment, based on the foregoing embodiment, the terminal device is a device supporting four antenna ports.

In an embodiment, on the basis of the foregoing embodiments, the precoding matrix corresponding to TPMI group G0 includes:

$$\frac{1}{2}\begin{bmatrix}1\\0\\0\\0\end{bmatrix}.$$

In an embodiment, on the basis of the foregoing embodiments, the precoding matrix corresponding to TPMI group G1 includes:

$$\frac{1}{2}\begin{bmatrix}1\\0\\0\\0\end{bmatrix},\frac{1}{2}\begin{bmatrix}0\\0\\1\\0\end{bmatrix},\frac{1}{2}\begin{bmatrix}1&0\\0&0\\0&1\\0&0\end{bmatrix}.$$

In an embodiment, on the basis of the foregoing embodiments, the precoding matrix corresponding to TPMI group G2 includes:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&1\\0&0\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}.$$

In an embodiment, on the basis of the foregoing embodiments, the precoding matrix corresponding to TPMI group G3 includes:

$$\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}.$$

In an embodiment, on the basis of the foregoing embodiments, the precoding matrix corresponding to TPMI group G4 includes:

$$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix}.$$

In an embodiment, on the basis of the foregoing embodiments, the precoding matrix corresponding to TPMI group G5 includes:

$$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix},$$

$$\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}.$$

In an embodiment, on the basis of the foregoing embodiments, the precoding matrix corresponding to TPMI group G6 includes:

$$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$$

$$\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0\\0&1\\0&0\\0&0\end{bmatrix}.$$

In an embodiment, on the basis of the foregoing embodiments, the sending module 10 is specifically configured to: report the first indication information to the network device through radio resource control (RRC) signaling.

In an embodiment, on the basis of the above-mentioned embodiment, the sending module 10 is further configured to: report second indication information to the network device, where the second indication information is used to indicate, through a 2-bit bitmap, whether two corresponding precoding matrices support full power transmission by the terminal device upon 2-port transmission.

In an embodiment, on the basis of the foregoing embodiments, a bit value of 1 in the bitmap is used to indicate that a precoding matrix corresponding to the bit supports full power transmission, and a bit value of 0 in the bitmap is used to indicate that a precoding matrix corresponding to the bit does not support full power transmission.

In an embodiment, the first indication information and the second indication information are transmitted through the same signaling.

In an embodiment, when the first indication information is sent to the network device, reporting of the second indication information is optional reporting.

In an embodiment, when the first indication information is sent to the network device, reporting of the second indication information is mandatory reporting.

Figure 7:
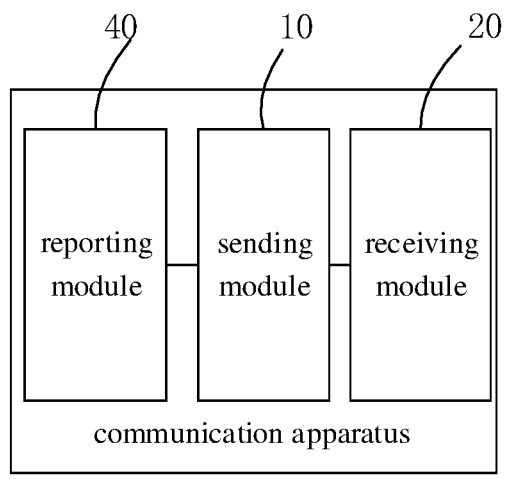
FIG. 7 is a block diagram of a communication apparatus provided by another embodiment of the present disclosure.

In an embodiment, on the basis of the foregoing embodiments, as shown in FIG. 7, the apparatus further includes a reporting module 40, configured to: report a first full power transmission mode to the network device.

In an embodiment, the first full power transmission mode is reported through the RRC signaling.

In an embodiment, the first full power transmission mode is reported through terminal capability signaling.

In an embodiment, when the first full power transmission mode is reported to the network device, reporting of the first TPMI group is optional reporting.

In an embodiment, when the first full power transmission mode is reported to the network device, reporting of the first TPMI group is mandatory reporting.

In an embodiment, the first full power transmission mode reporting, the first indication information and the second indication information are transmitted through the same signaling.

In an embodiment, the receiving module 20 is further configured to: receive a sounding reference signal (SRS) resource set indicated by the network device, where at least one sounding reference signal (SRS) resource is carried in the SRS resource set.

In an embodiment, the number of ports corresponding to part or all of SRS resources is different.

In an embodiment, the number of ports corresponding to the SRS resources is less than or equal to four.

In an embodiment, the number of spatial relationships corresponding to all SRS resources is less than or equal to two.

In an embodiment, the SRS resource set is used to support codebook based PUSCH transmission.

In an embodiment, a usage configuration corresponding to the SRS resource set is "codebook".

The implementation principle and the technical effects of the communication apparatus provided by the foregoing embodiments are similar to those of the foregoing method embodiments, and details are not described herein again.

Figure 8:
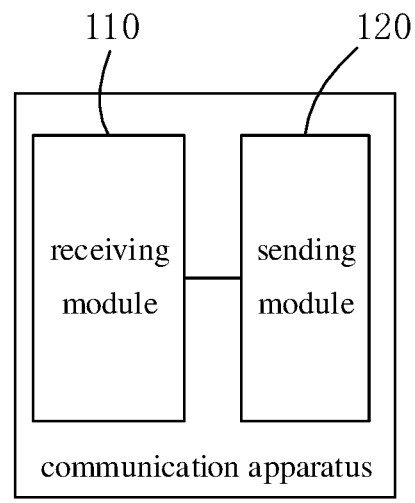
FIG. 8 is a block diagram of a communication apparatus provided by another embodiment of the present disclosure.

In an embodiment, there is provided a communication apparatus. As shown in FIG. 8, the communication apparatus includes a receiving module 110 and a sending module 120.

The receiving module 110 is configured to receive first indication information sent by a terminal device. The first indication information is used to indicate a first transmitted precoding matrix indicator (TPMI) group, and the first TPMI group is a TPMI group in a TPMI group set.

The sending module 120 is configured to send a first TPMI to the terminal device.

The implementation principle and the technical effects of the communication apparatus provided by the foregoing embodiments are similar to those of the foregoing method embodiments, and details are not described herein again.

The division of each module in the above communication apparatus is only for illustration. In other embodiments, the communication apparatus may be divided into different modules as needed to complete all or some functions of the above communication apparatus.

Specific definitions of the communication apparatus may refer to the definitions of the communication method above, which will not be repeated here. Various modules in the communication apparatus may be implemented in whole or in part by software, hardware, and a combination thereof. The various modules may be embedded in or independent of a processor in a computer device in the form of hardware, or may be stored in a memory in the computer device in the form of software, so as to facilitate the processor to call and execute the operations corresponding to the various modules.

Various modules in the network device provided in implementations of the present disclosure may be implemented in the form of a computer program. The computer program may run on a terminal or a server. Program modules constituted by the computer program may be stored in a memory of the terminal or the server. The computer program, when executed by the processor, implements the steps of the method described in implementations of the present disclosure.

Figure 9:
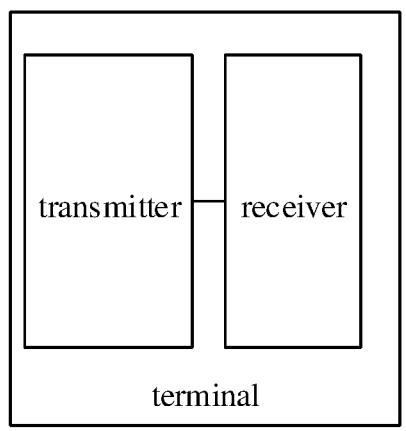
FIG. 9 is a schematic diagram of an internal structure of a terminal provided by an embodiment of the present disclosure.

In an embodiment, as shown in FIG. 9, there is provided a terminal, including a transmitter and a receiver.

The transmitter is configured to send first indication information to a network device. The first indication information is used to indicate a first transmitted precoding matrix indicator (TPMI) group, and the first TPMI group is a TPMI group in a TPMI group set.

The receiver is configured to receive a first TPMI indicated by the network device.

The implementation principle and the technical effects of the terminal provided by the foregoing embodiments are similar to those of the foregoing method embodiments, and details are not described herein again.

Figure 10:
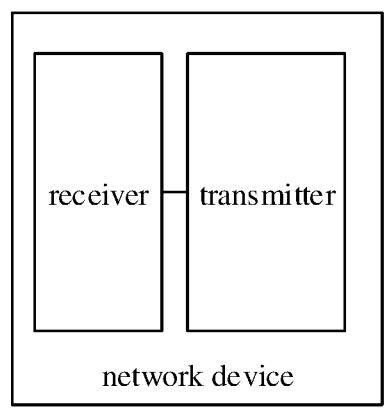
FIG. 10 is a schematic diagram of an internal structure of a network device provided by an embodiment of the present disclosure.

In an embodiment, as shown in FIG. 10, there is provided a network device, including a receiver and a transmitter.

The receiver is configured to receive first indication information sent by a terminal device. The first indication information is used to indicate a first transmitted precoding matrix indicator (TPMI) group, and the first TPMI group is a TPMI group in a TPMI group set.

The transmitter is configured to send a first TPMI to the terminal device.

The implementation principle and the technical effects of the network device provided by the foregoing embodiments are similar to those of the foregoing method embodiments, and details are not described herein again.

Those skilled in the art will understand that the structure shown in FIGS. 9 and 10 is only a block diagram of a part of a structure related to a solution of the present disclosure, but does not constitute restriction for the terminal or the network device to which the solution of the present disclosure is applied. A specific terminal or network device may include more or fewer components than those shown in the figures, or combine some components, or have different component arrangements.

Embodiments of the present disclosure also provide a computer-readable storage medium. One or more non-volatile computer-readable storage media contain computer-executable instructions that, when executed by one or more processors, cause the processors to perform the steps of a communication method.

The communication method includes steps of: sending first indication information to a network device, where the first indication information is used to indicate a first transmitted precoding matrix indicator (TPMI) group, and the first TPMI group is a TPMI group in a TPMI group set; and receiving a first TPMI indicated by the network device.

The implementation principle and technical effects of the computer-readable storage medium provided by the foregoing embodiments are similar to those of the foregoing method embodiments, and details are not described herein again.

Embodiments of the present disclosure also provide a computer-readable storage medium. One or more non-volatile computer-readable storage media contain computer-executable instructions that, when executed by one or more processors, cause the processors to perform the steps of a communication method.

The communication method includes steps of: receiving first indication information sent by a terminal device, where the first indication information is used to indicate a first transmitted precoding matrix indicator (TPMI) group, and the first TPMI group is a TPMI group in a TPMI group set; and sending a first TPMI to the terminal device.

The implementation principle and technical effects of the computer-readable storage medium provided by the foregoing embodiments are similar to those of the foregoing method embodiments, and details are not described herein again.

A computer program product contains instructions, when run on a computer, causes the computer to perform the communication method.

Any reference to a memory, a storage, a database, or another medium used in the present disclosure may include a non-transitory and/or transitory memory. The non-transitory memory may include a Read Only Memory (ROM), a Programmable ROM (PROM), an Electrically Programmable ROM (EPROM), an Electrically Erasable Programmable ROM (EEPROM), or a flash memory. The transitory memory may include a Random Access Memory (RAM), which is served as an external cache memory. By way of illustration and not limitation, a RAM is available in various forms, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Memory Bus (Rambus) Direct RAM (RDRAM), a Direct Memory Bus Dynamic RAM (DRDRAM), and a Memory Bus Dynamic RAM (RDRAM).

The implementations described above only provide several implementations of the present disclosure, and their descriptions are relatively specific and detailed, but they are not to be construed as limiting the protection scope of the present disclosure. It should be noted that for those of ordinary skill in the art, variations and improvements may be made without departing from the concept of the present disclosure, which fall within the protection scope of the present disclosure. The protection scope of the present disclosure is defined by the appended claims.

What is claimed is:
1. A method of wireless communication, comprising:
  reporting first indication information to a network device through radio resource control (RRC) signaling, wherein the first indication information indicates a first transmitted precoding matrix indicator (TPMI) group, and the first TPMI group is a TPMI group in a TPMI group set;

receiving a first TPMI indicated by the network device; and reporting second indication information to the network device, wherein the second indication information indicates, through a bitmap, whether a corresponding precoding matrix supports full power transmission by a terminal device upon 2-port transmission,
wherein the TPMI group set comprises at least eight TPMI groups,
wherein the at least eight TPMI groups comprise seven basic TPMI groups and at least one newly added TPMI group,
wherein the newly added TPMI group is obtained based on part or all of elements in the seven basic TPMI groups,
wherein the TPMI group in the TPMI group set comprises part of the seven basic TPMI groups and at least one newly added TPMI group, and
wherein the newly added TPMI group is obtained based on part or all of elements in the seven basic TPMI groups.

2. The method of claim 1, wherein:
a basic TPMI group is at least one of TPMI group G0, TPMI group G1, TPMI group G2, TPMI group G3, TPMI group G4, TPMI group G5, and TPMI group G6,
the seven basic TPMI groups comprise TPMI group G0, TPMI group G1, TPMI group G2, TPMI group G3, TPMI group G4, TPMI group G5, and TPMI group G6, and
the TPMI group in the TPMI group set at least comprises TPMI group G0, TPMI group G4, TPMI group G5, TPMI group G6, and the newly added TMPI group.

3. The method of claim 2, wherein:
the basic TPMI group corresponds to one or more of a number of first target ports of the terminal device or a number of second target ports of the terminal device,
a first target port is a port with full power transmission capability in the terminal device, and
a second target port is a port with half power transmission capability in the terminal device.

4. The method of claim 3, wherein the basic TPMI group comprises at least one of:
a precoding matrix in TPMI group G0 configured to indicate that one first target port is comprised in the terminal device,
a precoding matrix in TPMI group G1 configured to indicate that two first target ports are comprised in the terminal device,
a precoding matrix in TPMI group G2 configured to indicate that three first target ports are comprised in the terminal device,
a precoding matrix in TPMI group G3 configured to indicate that three second target ports are comprised in the terminal device,
a precoding matrix in TPMI group G4 configured to indicate that two coherent second target ports are comprised in the terminal device,
a precoding matrix in TPMI group G5 configured to indicate that three second target ports are comprised in the terminal device, the three second target ports including a coherent port group, and
a precoding matrix in TPMI group G6 configured to indicate that four second target ports are comprised in the terminal device, the four second target ports including two coherent port groups.

5. The method of claim 4, wherein:
a precoding matrix corresponding to the newly added TPMI group comprises a precoding matrix in TPMI group G0 and part or all of precoding matrices in a first set, and
the first set is at least one of TPMI group G4, TPMI group G5, and TPMI group G6.

6. The method of claim 5, wherein:
the precoding matrix corresponding to the newly added TPMI group comprises the precoding matrix in TPMI group G0 and part or all of precoding matrices in TPMI group G4,
the precoding matrix corresponding to the newly added TPMI group comprises the precoding matrix in TPMI group G0 and part or all of precoding matrices in TPMI group G5, and
the precoding matrix corresponding to the newly added TPMI group comprises the precoding matrix in TPMI group G0 and part or all of precoding matrices in TPMI group G6.

7. The method of claim 4, wherein a precoding matrix corresponding to the newly added TPMI group comprises:
part or all of precoding matrices in TPMI group G1 and part or all of precoding matrices in a first set, the first set being at least one of TPMI group G4, TPMI group G5, and TPMI group G6.

8. The method of claim 7, wherein:
the precoding matrix corresponding to the newly added TPMI group comprises part or all of precoding matrices in TPMI group G1 and part or all of precoding matrices in TPMI group G4,
the precoding matrix corresponding to the newly added TPMI group comprises part or all of precoding matrices in TPMI group G1 and part or all of precoding matrices in TPMI group G5, and
the precoding matrix corresponding to the newly added TPMI group comprises part or all of precoding matrices in TPMI group G1 and part or all of precoding matrices in TPMI group G6.

9. The method of claim 4, wherein:
a precoding matrix corresponding to the newly added TPMI group comprises part or all of precoding matrices in TPMI group G2 and part or all of precoding matrices in a second set, and
the second set is at least one of TPMI group G5 and TPMI group G6.

10. The method of claim 9, wherein:
the precoding matrix corresponding to the newly added TPMI group comprises part or all of precoding matrices in TPMI group G2 and part or all of precoding matrices in TPMI group G5, and
the precoding matrix corresponding to the newly added TPMI group comprises part or all of precoding matrices in TPMI group G2 and part or all of precoding matrices in TPMI group G6.

11. The method of claim 2, wherein:
the precoding matrix corresponding to TPMI group G0 comprises:

$$\frac{1}{2}\begin{bmatrix}1\\0\\0\\0\end{bmatrix};$$

the precoding matrix corresponding to TPMI group G1 comprises:

$$\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix};$$

the precoding matrix corresponding to TPMI group G2 comprises:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&1\\0&0\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix};$$

the precoding matrix corresponding to TPMI group G3 comprises:

$$\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix};$$

the precoding matrix corresponding to TPMI group G4 comprises:

$$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix};$$

the precoding matrix corresponding to TPMI group G5 comprises:

$$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}1&0\\0&0\\0&1\\0&0\end{bmatrix},$$

$$\frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix};$$

and
the precoding matrix corresponding to TPMI group G6 comprises:

$$\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix},$$

$$\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}, \frac{1}{2}\begin{bmatrix}1&0&0\\0&1&0\\0&0&1\\0&0&0\end{bmatrix}.$$

12. The method of claim 1, wherein:
a bit value of 1 in the bitmap is used to indicate that a precoding matrix corresponding to the bit supports the full power transmission, and
a bit value of 0 in the bitmap is used to indicate that a precoding matrix corresponding to the bit does not support the full power transmission.

13. The method of claim 1, wherein the first indication information and the second indication information are transmitted through the same signaling.

14. The method of claim 1, wherein when the first indication information is sent to the network device, the reporting of the second indication information is optional reporting.

15. The method of claim 1, further comprising:
reporting a first full power transmission mode to the network device,
wherein the first full power transmission mode is reported the RRC signaling.

16. The method of claim 15, wherein when the first full power transmission mode is reported to the network device, the reporting of the first indication information is mandatory reporting.

17. The method of claim 15, wherein a number of ports corresponding to sounding reference signal (SRS) resources is 1, 2, or 4.

18. The method of claim 15, wherein a number of spatial relationships corresponding to all sounding reference signal (SRS) resources is equal to two.

19. A terminal device, comprising:
a processor; and
memory storing instructions, which when executed by the processor, cause the processor to:
report first indication information to a network device through radio resource control (RRC) signaling, wherein the first indication information indicates a first transmitted precoding matrix indicator (TPMI) group, and the first TPMI group is a TPMI group in a TPMI group set;
receive a first TPMI indicated by the network device; and
report second indication information to the network device, wherein the second indication information indicates, through a bitmap, whether a corresponding precoding matrix supports full power transmission by the terminal device upon 2-port transmission,
wherein the TPMI group set comprises at least eight TPMI groups,
wherein the at least eight TPMI groups comprise seven basic TPMI groups and at least one newly added TPMI group,
wherein the newly added TPMI group is obtained based on part or all of elements in the seven basic TPMI groups,
wherein the TPMI group in the TPMI group set comprises part of seven basic TPMI groups and at least one newly added TPMI group, and
wherein the newly added TPMI group is obtained based on part or all of elements in the seven basic TPMI groups.

20. A network device, comprising:
a processor; and
memory storing instructions, which when executed by the processor, cause the processor to:
receive first indication information through radio resource control (RRC) signaling, wherein the first indication information indicates a first transmitted precoding matrix indicator (TPMI) group, and the first TPMI group is a TPMI group in a TPMI group set;
send a first TPMI; and
receive second indication information, wherein the second indication information indicates, through a bitmap, whether a corresponding precoding matrix supports full power transmission by a terminal device upon 2-port transmission,
wherein the TPMI group set comprises at least eight TPMI groups,
wherein the at least eight TPMI groups comprise seven basic TPMI groups and at least one newly added TPMI group,
wherein the newly added TPMI group is obtained based on part or all of elements in the seven basic TPMI groups,
wherein the TPMI group in the TPMI group set comprises part of seven basic TPMI groups and at least one newly added TPMI group, and
wherein the newly added TPMI group is obtained based on part or all of elements in the seven basic TPMI groups.

\* \* \* \* \*